United States Patent
Yamaguti et al.

(10) Patent No.: US 6,922,190 B2
(45) Date of Patent: Jul. 26, 2005

(54) PORTABLE INFORMATION TERMINAL

(75) Inventors: Yukio Yamaguti, Tokyo (JP); Hideo Mitsuhashi, Tokyo (JP)

(73) Assignee: NEC Corporation, Tokyo (JP)

(*) Notice: Subject to any disclaimer, the term of this patent is extended or adjusted under 35 U.S.C. 154(b) by 56 days.

(21) Appl. No.: 10/395,277

(22) Filed: Mar. 25, 2003

(65) Prior Publication Data

US 2003/0186719 A1 Oct. 2, 2003

(30) Foreign Application Priority Data

Mar. 26, 2002 (JP) ............................ 2002-086236

(51) Int. Cl.⁷ .................................... G09G 5/00
(52) U.S. Cl. ................. 345/206; 345/205; 379/429
(58) Field of Search .......................... 345/440, 158, 345/204, 205, 206, 901, 903, 905; 379/429, 433.02

(56) References Cited

U.S. PATENT DOCUMENTS 5,740,349 A * 4/1998 Hasbun et al. ................. 714/8
6,049,975 A * 4/2000 Clayton ........................ 29/832
6,724,618 B1 * 4/2004 Jenkins et al. ............... 361/684
2003/0005214 A1 * 1/2003 Chan .......................... 711/104

FOREIGN PATENT DOCUMENTS

| CN | 1253439 A | 5/2000 |
|----|-----------|--------|
| JP | H09-093319 A | 4/1997 |
| JP | H11-097814 A | 4/1999 |
| JP | 2001-189973 A | 7/2001 |

* cited by examiner

*Primary Examiner*—Matthew Luu
(74) *Attorney, Agent, or Firm*—Sughrue Mion, PLLC

(57) ABSTRACT

A portable information terminal according to the present invention uses a main board and a memory sheet. The main board has a complicated configuration. The memory sheet has silicon chips for memory. The memory sheet comprises a film-shaped circuit board and the silicon chips mounted on the film-shaped circuit board. A contact for the memory sheet is connected to a connecting terminal of the main board. This configuration allows the mounting of a large capacity of memory while keeping the thickness of the portable information terminal in a thin state. As a result, a portability-improved portable information terminal can be obtained in which a large capacity of memory was contained and miniaturization, thickness reduction and weight reduction were achieved.

16 Claims, 4 Drawing Sheets

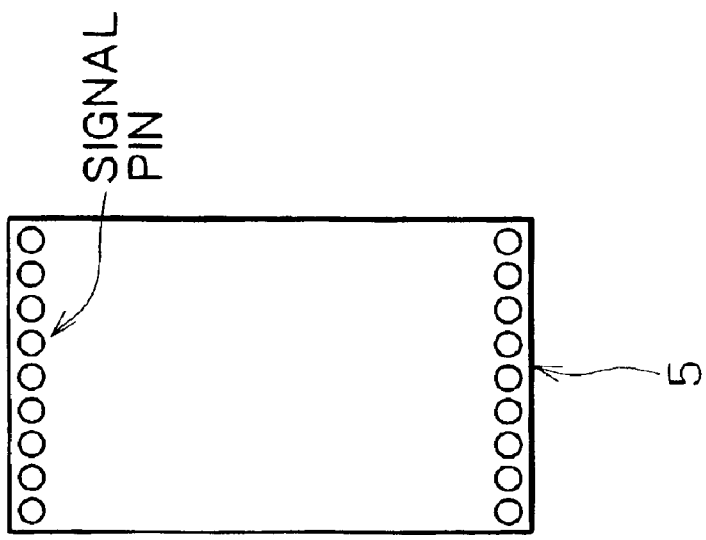
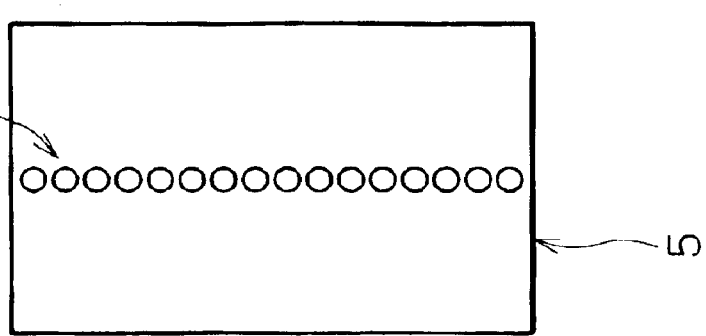
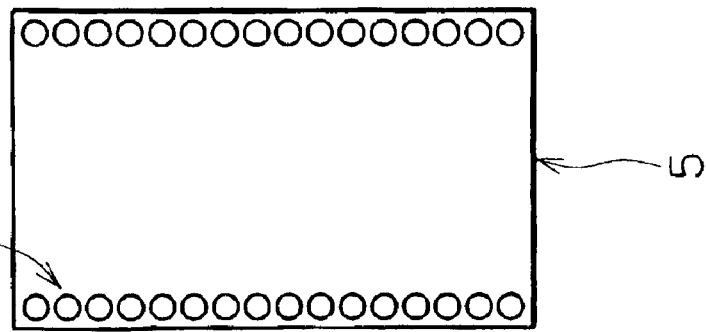

PORTABLE INFORMATION TERMINAL

BACKGROUND OF THE INVENTION

1. Technical Field of the Invention

The present invention relates to a portable information terminal, and specifically relates to a handy-sized compact, lightweight and slim portable information terminal, typified by a portable telephone or a PDA (Personal Digital Assistant).

2. Description of the Related Art

Recently, demands for a mobile wireless device such as a portable telephone or the like and a portable terminal have been increased. Conventional portable information terminals such as a mobile wireless device and the like include a portable information terminal in which an external memory module such as a SmartMedia card, a SD (Secure Digital) memory card or the like is used while being inserted into a connector terminal attached to the portable information terminal. Japanese patent laid-open publication No. 2001-189973 discloses a conventional portable telephone.

However, in the conventional portable information terminal in which the external memory module is used while being inserted into a connector terminal attached to the portable information terminal, a connecting socket holder 12 for allowing the external memory module 11 to function is provided as shown in FIG. 1. Therefore, it is necessary to increase the thickness of a mobile information terminal itself and it is difficult to realize further miniaturization, thickness reduction, and weight reduction. Additionally, the handling, saving and reproducing of a large number of information data of moving images, IT information and the like cannot be performed.

Further, when the external memory module 11 is used, a protecting circuit must be provided on the external memory module 11 itself for protecting copy right of information saved in the external memory module 11. Thus, a host circuit for passing information through the protecting circuit provided in the external memory module is also needed in a portable information terminal. Therefore, since electronic parts for the protecting circuit and the host circuit are mounted on the portable information terminal, the volume of the portable information terminal itself is increased. Further, since the external memory module 11 is not present in the portable information terminal body and has a small and simple structure, it can be broken and lost.

Furthermore, to contain a usual memory device in the portable information terminal a board has a plurality of parts so that the thickness of the portable information terminal is rapidly increased by 2 mm of additional parts and the board. Further, when an external memory module 11 is used for realizing a large capacity memory, a socket holder 12 is contained in a terminal device. Thus, the portable information terminal is further increased in thickness by about 2 mm although differentiated by size and arrangement thereof.

SUMMARY OF THE INVENTION

It is, accordingly, a general object of the present invention to provide a portable information terminal, which is miniaturized and reduced in thickness and weight and improved portability and which contained a low power consumption and large capacity memory.

A portable information terminal according to the present invention comprises a display section for displaying required data and commands; an operating section for inputting the data and commands: a communication section for transmitting/receiving the data and commands between the communication section and external devices; and a control section for controlling each section. And at least the communication section and the control section are disposed on the main board and at least data is stored in a sheet-shaped memory member. This sheet-shaped memory member is connected to the main board.

Further, the communication section can receive data transmitted by infrared communication, cable communication or wireless communication from required external devices to store them in the memory member.

The memory member can be composed of a thin sheet-shaped memory sheet having a thickness of 0.2 mm or less.

Further, the memory sheet can be formed such that one or a plurality of silicon chips can be disposed on a required film-shaped circuit board.

The silicon chip can be composed of a nonvolatile memory.

The nonvolatile memory can be a NAND Flash memory.

Further, the memory sheet forming the memory member can be connected to the main board forming the portable information terminal only at its one side.

Further, the memory sheet forming the memory member may have such a structure that the memory sheet is disposed inside the portable information terminal and cannot be removed.

Further, the communication section may have a function, which performs data communication between the communication section and other devices.

BRIEF DESCRIPTION OF THE DRAWINGS

FIGS. 4A to 4C are views showing examples of arrangements of signal pins in silicon chips.

DETAILED DESCRIPTION OF THE PREFERRED EMBODIMENTS

A feature of a portable information terminal according to the present invention resides in that the body of the portable information terminal comprising a means of displaying electronic information, a means of operating the information and a communication means includes a memory member capable of handling, saving and reproducing a large capacity of information data without providing a connecting socket holder for causing an external memory module to function.

Figure 2:
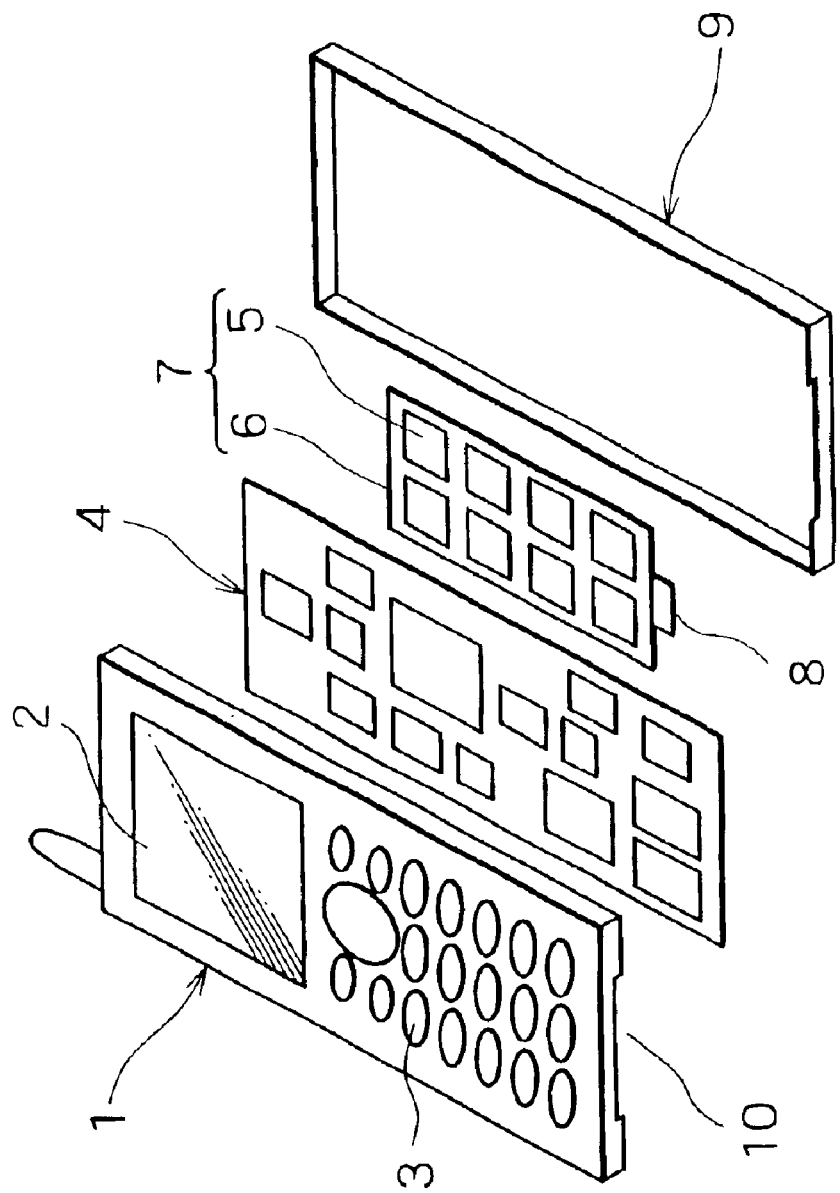
FIG. 2 is a perspective view showing a configuration of a embodiment of a portable information terminal according to the present invention.

FIG. 2 is a perspective view showing an embodiment of a configuration of one embodiment of a portable information terminal according to the present invention. As shown in FIG. 2, as a large capacity of memory member, which stores data, a memory sheet 7 was used in which 8 silicon chips 5-1 to 5-8 (see FIG. 3, and the silicon chips 5-1 to 5-8 are referred to only silicon chips 5 if there is not necessity of differentiating the silicon chips 5-1 to 5-8 from the silicon chips 5) were directly connected to a film-shaped circuit board 6 having a thickness of for example of 0.1 mm or less and mounted thereon. Then on this memory sheet 7 was provided a connecting contact 8 with a main board 4, and the contact 8 was connected to a connector (not shown) provided on a main wiring board 4 (which is appropriately described as a main board 4 below) of a portable information terminal and was mounted in the portable information terminal.

Figure 1:
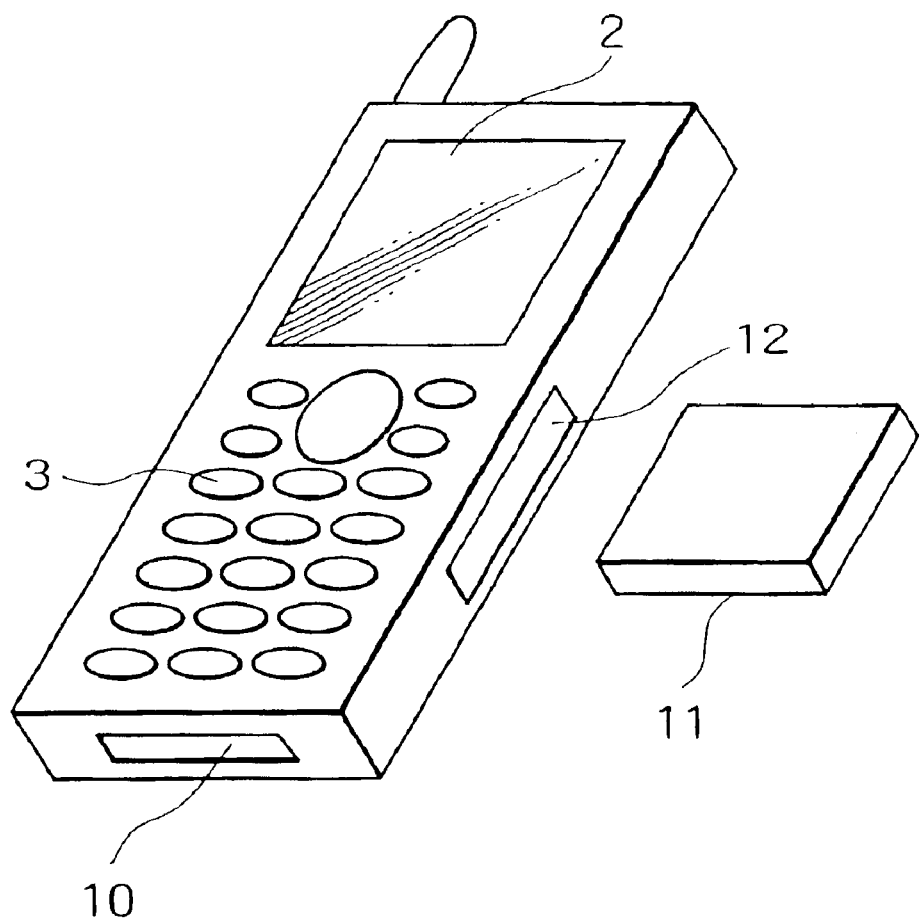
FIG. 1 is a perspective view showing a configuration of one example of a conventional portable information terminal.

Then, a plurality of boards are contained in the portable information terminal. That is there are two boards of the main board 4 and the memory sheet 7. However, since the memory sheet 7 can be disposed in a space in the portable information terminal, a large capacity of memory member, which stores a large number of data, can be mounted on the portable information terminal without increasing the thickness and size of the portable information terminal itself. Therefore, the portable information terminal of this embodiment of the present invention can be made smaller and thinner as compared with a case where the socket holder 12 (FIG. 1) for connecting the external memory module 11 (FIG. 1).

Further, the contact 8 for connecting the film-shaped circuit board 6 (memory sheet 7) to the main board 4 is provided on only one side of the film-shaped circuit board 6 (memory sheet 7), and a structure can be realized in which the other three sides in the film-shaped circuit board 6 is not fixed by collecting wiring connected to the main board 4 in the wiring on the film-shaped circuit board 6 in the contact 8. As a result the film-shaped circuit board 6 can be made stress-free. Accordingly, when a portable information terminal is deformed by external forces, stress to the contact 8 can be relieved by deforming the film-shaped circuit board 6 freely and breakage of the portable information terminal can be prevented.

In the embodiment having the above-mentioned configuration, since it is not necessary to provide a connecting socket holder 12 for causing an external memory module 11 to function unlike a conventional case, miniaturization and thickness reduction of the portable information terminal can be attained whereby portability can be improved.

Further, in the present embodiment, moving image data, IT data or music data is received by a communication means, which perform cable communication via an external connecting terminal, wireless communication or infrared communication or the like, and the above-mentioned large number of data can be stored in the memory sheet 7, which is a large capacity of memory member provided inside. The stored data is displayed on a display section 2 and is selected and processed by operating an operation key 3. After that the data is saved and marked whereby the data can be fully used and unnecessary data can be erased.

Further, since the embodiment of the present invention has a configuration, which has no communication means for transmitting data stored in the memory sheet 7, which is the large capacity of memory member, to an external section, the rights of copyright holders can be protected without providing protection circuits on the memory sheet 7, which is a large capacity of memory member, and the portable information terminal body. Further by removing a protection circuit for protecting copyright miniaturization and thickness reduction of the portable information terminal can be attained whereby portability can be further enhanced.

Next, a configuration and an operation of an embodiment according to the present invention will be described in detail. Referring to FIG. 2, according to the embodiment of the invention, a surface of a surface cover 1 is provided with a display section 2 and operation keys 3. The underside of the surface cover 1 is provided an external connecting terminal slot 10 for performing cable communication with not-shown external devices such as a personal computer and a diagnosis system. Further, a main board 4 is inserted into the back side of the surface cover 1, and the display section 2 and the operation keys 3 are connected to the main board 4 by a not-shown flat cable or the like.

In the case of the present embodiment, on the back of the main board 4 is disposed the memory sheet 7 on which 8 memory silicon chips 5-1 to 5-8 were directly mounted on the film-shaped circuit board 6, and the contact 8 of the memory sheet 7 is connected to a not-shown connecting terminal of the main board 4.

The silicon chips 5 are mounted on the film-shaped circuit board 6 by a soldering process like the flip-chip mounting, a pressure-welding process in which after forming gold bumps on the terminals of the silicon chips 5, gold plating is performed on the pad on the silicon chips 5-mounted film-shaped circuit board 6 side, the gold bumps and the pad are brought into contact with each other so that the silicon chips 5 and the film-shaped circuit board 6 are fixed to each other by resin, a thermo-compression bonding process of boding gold bumps formed on the terminals of the silicon chips 5 and gold in gold plated portion formed on a pad on the silicon chips 5-mounted film-shaped circuit board 6 side by heat and ultrasound, and a process of bonding the gold bump and the pad by materials such as an anisotropic electrically conductive resin and the like.

In the configuration of the present embodiment, even if a wring member on the surface and the back of which wiring layers were formed is two-layered flexible board, chips each having a pin number level of 50, in which commonality of address signal pins and data signal pins are achieved, allows the connection of electrical signals like the silicon chips 5.

The individual memory generally has 16 data signal pins, 20 to 30 address signal pins and about a few tens of control pins as well as power supply pins. Reading and writing of a specific memory chip is performed by connecting the data signal pins, address signal pins and control pins to a number of memories and sending signals to selected pins of the chips. As described above, according to the embodiment, even if there are n memories, signal lines of $(16+20+10) \times n$ are not needed, and a small number of signal lines of $(16+20+10+n)$ is sufficient. Further wiring can be drawn if it has a width of about 200 micrometer ($\mu$m) and a memory sheet width has about 10 mm. The reason why the wiring needs two layers is that the wiring must be drawn in the X and Y directions.

Figure 3:
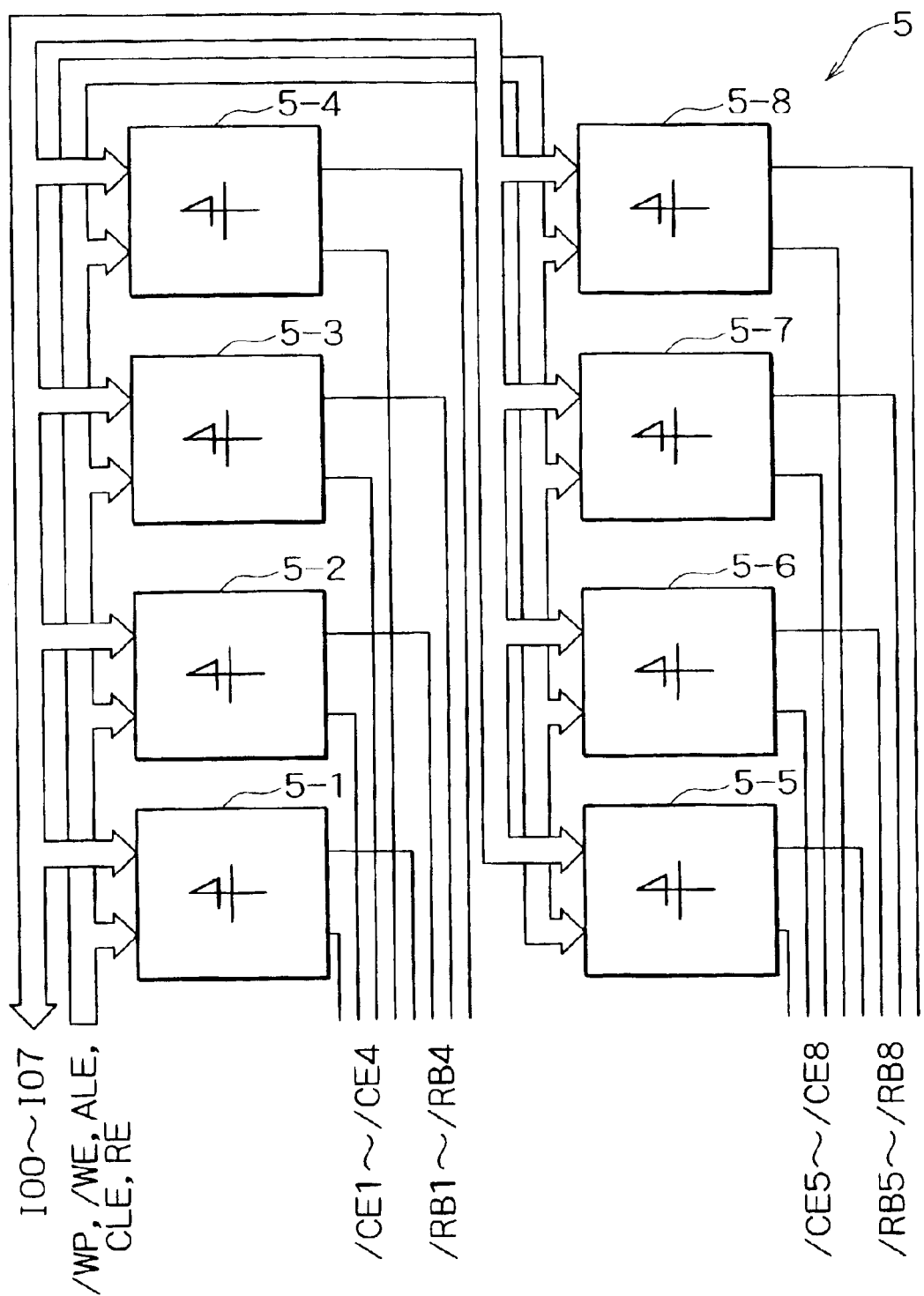
FIG. 3 is a diagram showing a wiring example of a silicon chip.

FIG. 3 shows the silicon chips 5 disposed on the film-shaped circuit board 6 and the state of wiring on the respective silicon chips 5. As shown in FIG. 3, the silicon chips 5-1 to 5-8 are disposed on the film-shaped circuit board 6 at established intervals, and wiring for electrically connecting the respective silicon chips 5-1 to 5-8 to each other is formed on the surface and back of the film-shaped circuit board 6. That is two wiring layers are formed.

FIGS. 4A to 4C show three types of the arrangement of signal pins on the silicon chip 5. Particularly, FIG. 4A shows an example in which two rows of signal pins are arranged along opposite two long sides on the back of the silicon chip 5. FIG. 4B shows an example in which signal pins are aligned in a line on the centerline of the short sides of the silicon chip 5. FIG. 4C shows an example in which two rows of signal pins are arranged along opposite two short sides on the back of the silicon chip 5.

Further, the contact 8 on the memory sheet 7 is connected to a not-shown connecting terminal provided on the main board 4 by soldering or by means of an anisotropic electrically conductive resin or the like. Alternatively, the memory sheet 7 can also be connected to the main board 4 by use of a not-shown thin connecting connector terminal provided on the main board 4. The not-shown connecting terminal or thin connecting connector terminal may be provided on an edge portion on the back of the main board 4, or may be provided in the vicinity of the center of the main board 4 in accordance with the contact 8 on the memory sheet 7. Alternatively, the not-shown connecting terminal or thin connecting connector terminal may be provided on the surface of the main board 4. Further, a back cover 9 is formed such that it is fitted into the surface cover 1 at its periphery to seal the portable information terminal. Although not shown in FIG. 2, as another power supply a battery is contained.

Next, the operation of the present embodiment will be described. As the silicon chips 5 used as memory in the memory sheet 7, those in a larger number, which cannot be mounted on the main board 4 and having a large capacity are used. For example, in a portable telephone about two or more memories having a capacity of about 64 Mbits are mounted on the main board 4. However, although the type of the memory is different from that of said memory, 64 Mbits or more large memory can be realized in the memory sheet 7 by increasing the number of mounted memories. For example, when 16 memories each having 256 Mbits are mounted, the memory capacity reaches about 4 Gbits.

As a result a lot of video data having a large amount of data or the like can be stored. For example, the type of memory to be used is a nonvolatile memory, and NAND Flash memories each having large capacity can be principally used. Further, to increase the function of a portable information terminal parts mounted on the main board 4 are increased. Accordingly, when the parts are overflowed from the main board 4, the memory section on the main board 4 may be shifted to the memory sheet 7.

Since usual LSI (large scale integrated circuit) or memory device uses a TSOP (thin small out-line package) or BGA (ball grid array) case, the thickness of a board becomes 1 to 1.4 mm, which is thick. Thus, when a board having a complicated configurations are used, the thickness of the structure including the thickness of the board is increased every about 2 mm and the thickness of a portable information terminal is abruptly increased.

Alternatively, as in a conventional case, when an external memory module 11 is used to realize a large capacity of memory, a socket holder 12 must be contained in the portable information terminal. Therefore, the thickness of the portable information terminal is increased by about 2 mm although differentiated by the size or arrangement thereof.

Although the present embodiment has a board having a complicated configurations, a thickness of the silicon chip 5 forming the memory sheet 7 is about 0.2 mm and the increased thickness including the thickness of the thin film-shaped circuit board and the connecting portion (the thickness of the contact 8) is only about 0.4 mm. Therefore, a large capacity of memory can be given to the portable information terminal while keeping the portable information terminal in a thin state.

In the film-shaped circuit board 6 forming the memory sheet 7 a thickness of 0.1 mm or less can be realized by reducing the number of pins in the silicon chip 5 and providing commonality of wiring and by use of a double-sided board having one layer on each of the surface and back of the board, particularly a flexible base material such as a polyimide resin. This combination can realize a memory sheet 7 having a thickness of 0.35 mm.

By collecting the contact 8 on one side of the memory sheet 7 only a narrow region in the memory sheet 7 is supported by the contact 8 and other regions in the memory sheet 7 are not constrained. Thus, even if the portable information terminal or its inner main board 4 is deformed, the direct stress on the memory sheet 7 can be reduced.

Further, the memory device needs a bias test, which takes long time, for screening as a device, particularly, as quality assurance of a device and handling of a single silicon chip 5 and its test are difficult resulting in an expensive cost. Thus, a form of directly mounting the silicon chips 5 for memories on the film-shaped circuit board 6 is not almost used.

According to the present embodiment, after mounting the silicon chips 5 for memories in the memory sheet 7 on the same film-shaped circuit board 6, bias tests for the memory sheet 7 are easily performed by one operation. Then the embodiment can realize products, which stand comparison with a case where the silicon chip other than the memory is directly mounted, in the respects of quality and reliability. Further, according to the present embodiment, thickness reduction and miniaturization of the portable information terminal can be realized. Additionally, since the type and the number of the memories on the memory sheet 7 can be changed, the optimization of the portable information terminal according to the objects can be also performed.

Further, since the external memory module 11 is not provided in the embodiment, the taking out of music data and various data having copyrights to the outside can be blocked without increasing a new device. When the transmitting/receiving of data to or from the outside is potentially needed, software by which only the data which makes copyright unnecessary can be transmitted to or received from external devices such as other portable information terminals and personal computers and the like, can be provided in the respective devices.

As described above, according to the present embodiment, the following effects can be obtained. A first effect is that a large amount of electronic data can be stored while keeping the portable device in a compact and thin type. The reason is that a large amount of memories were mounted in thin silicon chips 5. A second effect is that electronic data having copyrights can be easily protected. The reason is that the external memory module 11 is not provided unlike a conventional case and the taking out of music data on the internal memory and various electronic data having copyrights to the outside can be blocked.

It is noted that the concrete numerals used in the above-mentioned embodiment is examples and are not limited thereto.

Further, the configuration and operation in the embodiment are examples and they can be of course appropriately changed in a scope from which the gist of the present invention is not deviated.

As described above, in the portable information terminal of the present invention, at least the communication section and the control section are disposed on a main board, and the portable information terminal of the present invention includes at least a sheet-shaped memory member (memory sheet), which stores data. Since the sheet-shaped memory member is connected to the main board, a portable information terminal having a large amount of capacity of memory can be realized.

Further, by providing a connecting section, which connects a memory sheet forming the memory member to the main board, on one side of the memory sheet, the memory sheet for the memory member can be made stress-free and the stress on the memory member can be reduced.

What is claimed is:

1. A portable information terminal comprising:

a display section for displaying data and commands;

an operating section for inputting said data and commands;

a communication section for transmitting/receiving said data and commands between said communication section and external devices;

a control section for controlling each section;

a main board on which at least said communication section and said control section are disposed; and a sheet-shaped memory member, which stores at least said data and is connected to said main board, and which has a flexible base material and a memory chip mounted on said flexible base material.

2. A portable information terminal according to claim 1, wherein said communication section receives said data transmitted by infrared communication, cable communication or wireless communication from the external devices to store them in said memory member.

3. A portable information terminal according to claim 1, wherein said memory member has a thickness of 0.2 mm or less.

4. A portable information terminal according to claim 2, wherein said memory member has a thickness of 0.2 mm or less.

5. A portable information terminal according to claim 3, wherein said memory member comprises a circuit board on which is disposed at least one semiconductor chip.

6. A portable information terminal according to claim 4, wherein said memory member comprises a circuit board on which is disposed at least one semiconductor chip.

7. A portable information terminal according to claim 5, wherein said at least one semiconductor chip includes a nonvolatile memory.

8. A portable information terminal according to claim 6, wherein said at least one semiconductor chip includes a nonvolatile memory.

9. A portable information terminal according to claim 7, wherein said nonvolatile memory is a NAND Flash memory.

10. A portable information terminal according to claim 8, wherein said nonvolatile memory is a NAND Flash memory.

11. A portable information terminal according to claim 3, wherein said memory member has a connection terminal for connecting only one side of said memory member to said main board.

12. A portable information terminal according to claim 4, wherein said memory member has a connection terminal for connecting only one side of said memory member to said main board.

13. A portable information terminal according to claim 3, wherein said memory member is disposed inside and fixedly attached to said portable information terminal.

14. A portable information terminal according to claim 4, wherein said memory member is disposed inside and fixedly attached to said portable information terminal.

15. A portable information terminal according to claim 3, wherein said communication section includes a means for performing data communication between said communication section and other devices.

16. A portable information terminal according to claim 4, wherein said communication section includes a means for performing data communication between said communication section and other devices.

* * * * *